United States Patent [19]

Ochiai et al.

[11] Patent Number: 4,742,466
[45] Date of Patent: May 3, 1988

[54] SYSTEM FOR MEASURING PATH COVERAGE REPRESENTED BY THE DEGREE OF PASSAGE OF EXECUTION PATHS IN A PROGRAM

[75] Inventors: Masao Ochiai; Masaharu Nozaki, both of Tokyo, Japan

[73] Assignee: Kabushiki Kaisha Toshiba, Kawasaki, Japan

[21] Appl. No.: 833,595

[22] Filed: Feb. 27, 1986

[30] Foreign Application Priority Data

Feb. 28, 1985 [JP] Japan .................................. 60-39301
Feb. 28, 1985 [JP] Japan .................................. 60-39302

[51] Int. Cl.⁴ .............................................. G06F 1/00
[52] U.S. Cl. .................................................. 364/200
[58] Field of Search ... 364/200 MS File, 900 MS File

[56] References Cited

U.S. PATENT DOCUMENTS 4,276,595  6/1981  Brereton et al. .................... 364/200
4,571,673  2/1986  Horst et al. ......................... 364/200

Primary Examiner—Raulfe B. Zache
Attorney, Agent, or Firm—Finnegan, Henderson, Farabow, Garrett & Dunner

[57] ABSTRACT

A system of the invention has a compiler for converting a conditional branch instruction, located in a source program being converted into an object program, into a conditional branch instruction having a flag field in which data is set representing whether a branch has been made. A load module generated from the object program through a linker is stored in a main memory. An instruction fetched from the main memory is decoded by an instruction decoder. A branch condition determination section determines if the instruction is "branch" or "through" and changes the flag field data. The program, now including a conditional branch instruction with the changed data, is rewritten into the load module.

6 Claims, 6 Drawing Sheets

FIG. 3

| STEP NUMBER | BRANCH INSTRUCTION | B OR COVERAGE | T OR THROUGH |
|---|---|---|---|
| 10 | xxxx | 1 | 1 |
| 35 | xxxx | 0 | 1 |
| 52 | xxxx | 1 | 0 |
| 71 | xxxx | 0 | 0 |
| ⋮ | ⋮ | ⋮ | ⋮ |
| PASS COVERAGE RATE | | xx | % |

F I G. 4
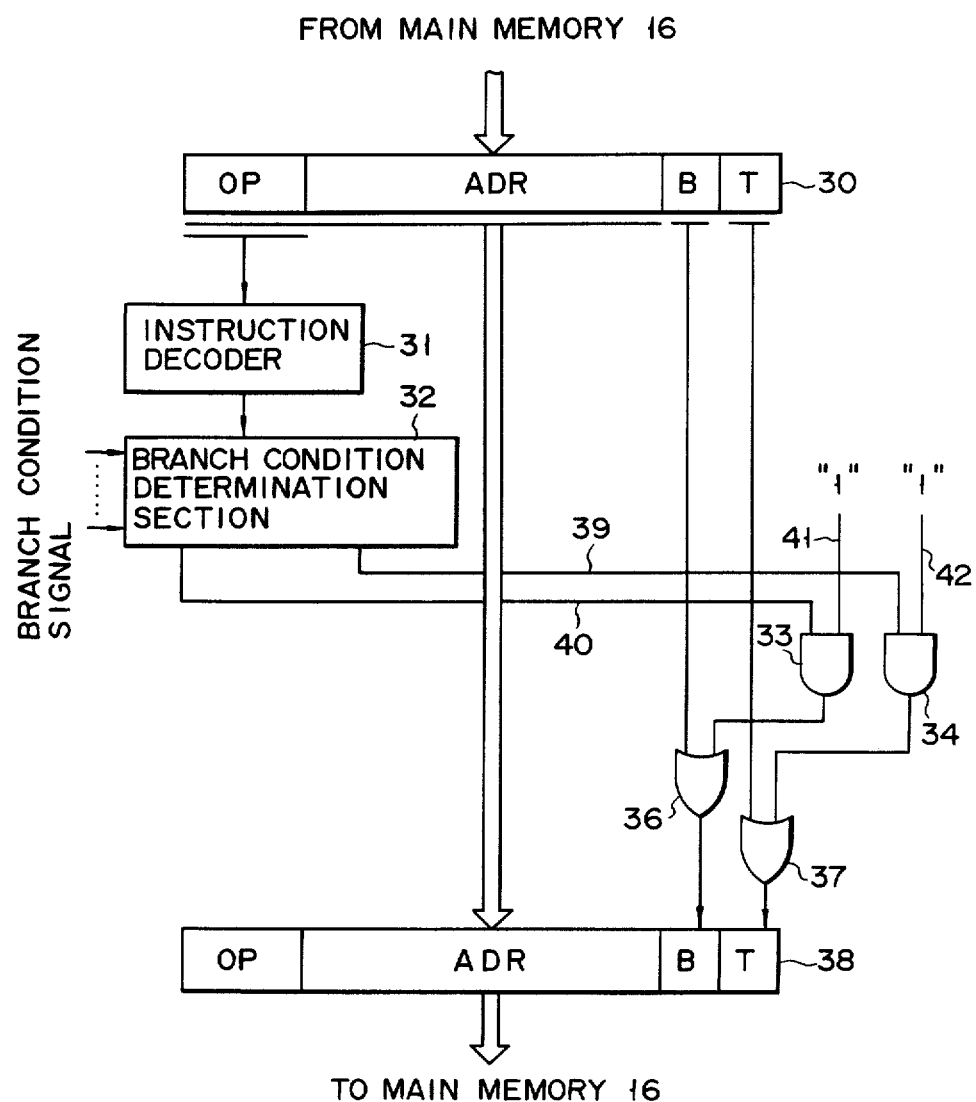

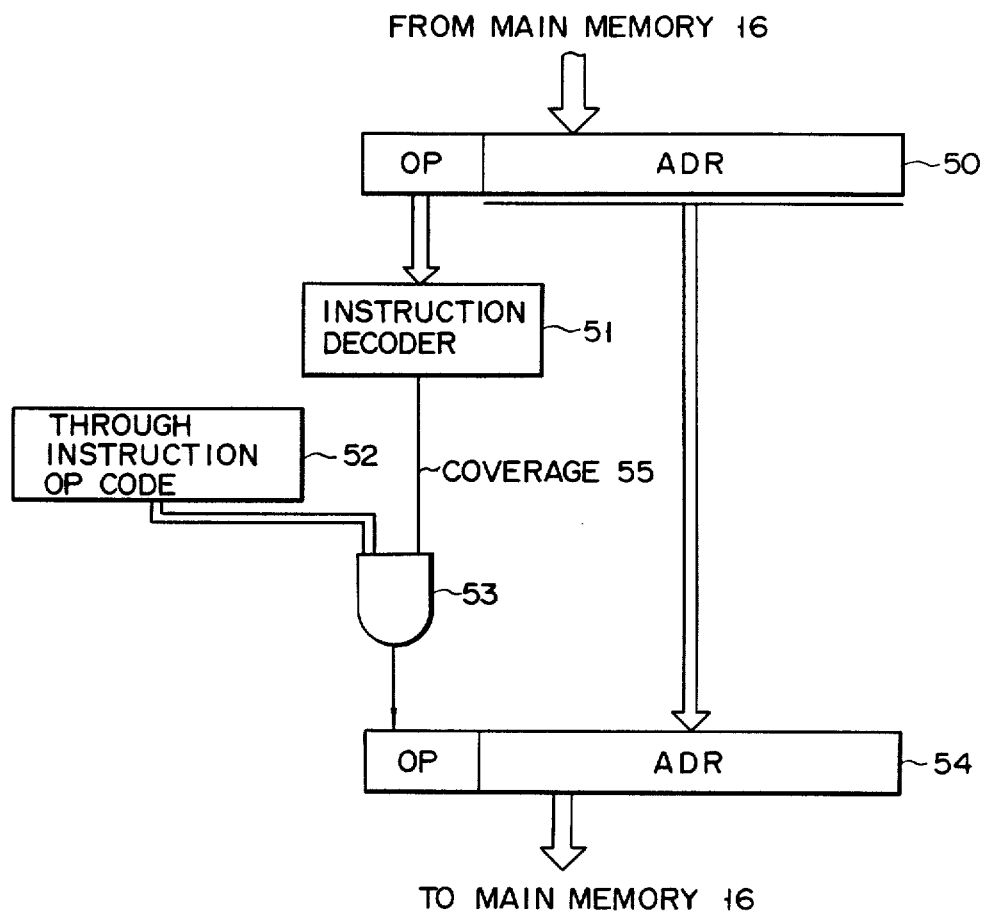
F I G. 6

SYSTEM FOR MEASURING PATH COVERAGE REPRESENTED BY THE DEGREE OF PASSAGE OF EXECUTION PATHS IN A PROGRAM

BACKGROUND OF THE INVENTION

1. Field of the Invention

The present invention relates to a path coverage measuring system for measuring the path coverage, representing the degree of passage of execution paths in a program.

2. Description of the Prior Art

In a conventional path coverage measuring system of the type described above, when a program is compiled by a compiler, special instructions for generating interrupts are inserted in all paths in the program, i.e., all paths generated due to branch instructions. A CPU (central processing unit) executes the interrupt routine in response to the interrupt request, signal, recognizes the passage of the special instructions, and then measures the path coverage. The path coverage thus represents an index for the completion of the program test.

However, in a conventional path coverage measuring system, program processing speed is reduced since each time the interrupt routine is executed upon detecting the special instructions. Therefore, it has been difficult to measure path coverage in real time through actual operation.

SUMMARY OF THE INVENTION

It is an object of the present invention to provide a path coverage measuring system which can significantly reduce the overhead due to the path coverage measurement and which can measure path coverage in real time during actual operation.

In order to achieve the above object of the present invention, a path coverage measuring system is provided, which comprises:

a main memory;

a central processing unit connected to the main memory;

means connected to main memory and the central processing unit for generating a load module which includes conditional branch instructions each having a flag field which is set to a first state when control has branched and which is set to a second state when control has passed without branching;

means connected to main memory for loading the load module in the main memory as an executable program;

decoding/executing means provided in the central processing unit and connected to main memory, for decoding an instruction from the main memory, and for changing, when the instruction is a conditional branch instruction, the state of the flag field in the conditional branch instruction, in accordance with a branch condition of the conditional branch instruction; and means connected to main memory and the means for loading the load module for rewriting part or all of the program to the load module, and obtaining a path coverage measurement from the load module after execution, when part or all of the program is unloaded from the main memory.

The present invention has the following effects:

(i) Software such as the interrupt routine for the path coverage measurement is eliminated. Therefore, since the overhead due to changing the contents of the flag field is reduced, path coverage measurement can be performed in real time while processing actual transactions.

(ii) Unlike conventional systems, the program size is not increased due to the elimination of the special instructions set in the program.

(iii) The load module itself can store the status of a conditional branch instruction which has been executed, in the flag field of the branch instruction. Therefore, during each execution, the load module accumulates the status of the branch instructions. Thus, the path coverage measurement can cover all executions of the load module which have been executed before the pass coverage report is printed out.

(iv) The execution of a COVERAGE instruction (store instruction) converts itself into a THROUGH instruction (no operation instruction). The overhead due to the execution of COVERAGE instruction (second instruction) is significantly reduced compared to the execution of the software. Furthermore, there is no overhead required for the execution of THROUGH instructions. Therefore, increasing path coverage allows a proportional reduction in the number of COVERAGE instructions. Therefore, the overhead is further reduced.

(v) The load module itself can store path coverage by changing COVERAGE instructions into THROUGH instructions. Therefore, for each execution, the load module accumulates the path coverage. Thus, the path coverage measurement can cover all executions of the load module executed before the path coverage report is printed out.

BRIEF DESCRIPTION OF THE DRAWINGS

Other objects and features of the present invention will be apparent from the following description in connection with the accompanying drawings, in which:

FIG. 3 shows an example of the path coverage report;

FIG. 4 is a detailed block diagram of decoding and execution section 17 in FIG. 1A;

FIG. 6 is a detailed block diagram of the decoding and execution section in another embodiment in FIG. 5.

DETAILED DESCRIPTION OF THE PREFERRED EMBODIMENTS

Figure 1A:
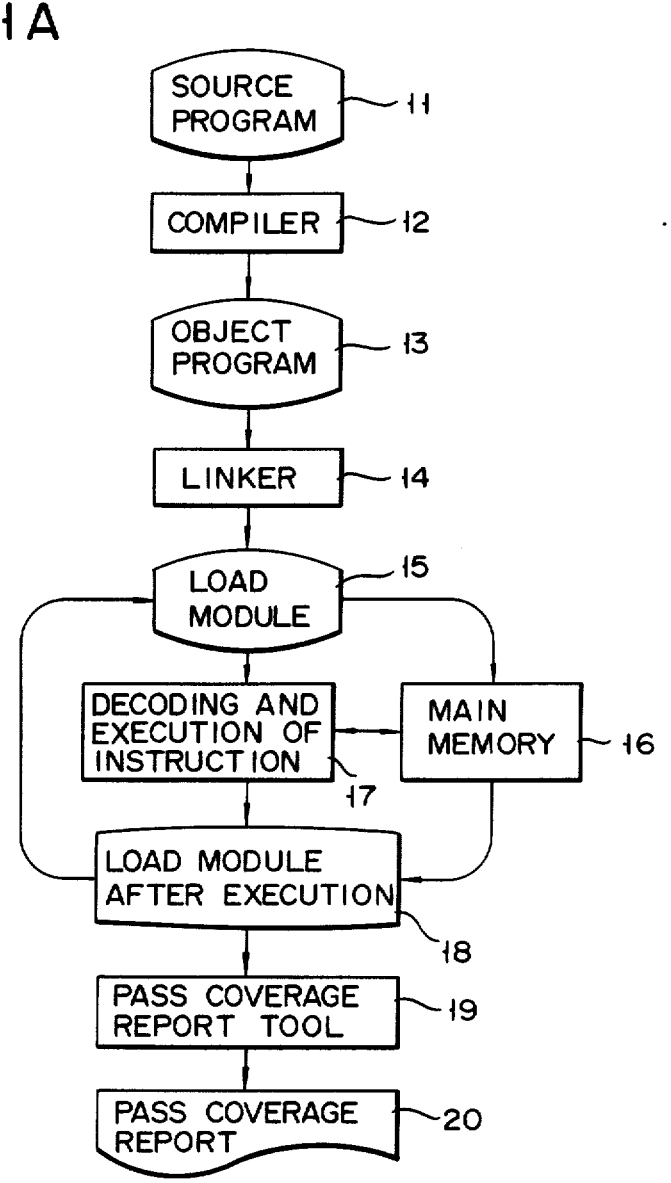
FIG. 1A is a flow chart showing the measurement process due to a path coverage measuring system according to the present invention.
Figure 1B:
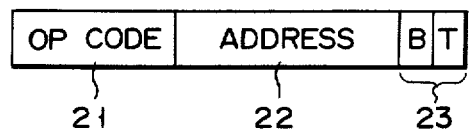
FIG. 1B shows a format of a conditional branch instruction used in the system of the present invention.

Referring to FIG. 1A, source program 11 to be subjected to path coverage measurement is translated by compiler 12 to generate object program 13. In the compilation, compiler 12 translates each of the encountered conventional conditional instructions in the program in an object code having the format shown in FIG. 1B.

Each instruction contains operation code field 21 representing the type of conditional branch instruction, address field 22 representing a destination address, and flag field 23 representing the execution history of this instruction. Flag field 23 consists of a branch bit (B), which indicates that a branch has been made, and a through bit (T), indicating the flow has passed the path without branching. Both B and T bits are set to "0" in an initial state, i.e., before the instruction is executed. Object program 13 is linked to a single machine language program by linker 14, to generate load module 15.

When the program is executed, load module 15 is loaded in main memory 16 by an operating system (OS) as an executable program. Decoding and execution section 17, comprising a central processing unit (CPU), sequentially reads out, decodes, and executes instructions from the program in main memory 16.

Section 17 decodes a conditional branch instruction, and changes the contents of field 23 in accordance with the executed result thereof. Section 17 writes logic "1" in B bit of field 23 when branching is performed. Section 17 writes logic "1" in T bit of field 23 when no-branching (passing) is carried out. Since this program is repeatedly performed, logic "138 may already be written in the T or B bit. In such a case, this write operation can be omitted. Section 17 performs the processing necessary for branching or passing after writing flag data in field 23.

FIG. 4 shows an example of means provided in section 17, for writing flag data in field 23. An instruction from main memory 16 is set in instruction register 30. Instruction decoder 31 decodes operation code OP of the instruction in register 30. Upon decoding the instruction in register 30 as a conditional branch instruction, decoder 31 supplies a trigger signal to branch condition determination section 32. Section 32 determines the branch conditions based on a branch condition signal supplied from a control section which is not shown. Upon determining that the condition is branching, section 32 sends signal 40 to AND gate 33. Upon no-branching (passing), section 32 sends signal 39 to AND gate 34. Signals of logic "1" are supplied to the other input terminals of AND gates 33 and 34. Output signals from AND gates 33 and 34 are supplied to one of the input terminals of OR gates 36 and 37, respectively. OR gates 36 and 37 also receive the signals of B and T bits from register 30. Signals OP and ADR from register 30 and the signals from OR gates 36 and 37 are set in register 38 at a predetermined timing and written at the same address as the read address of main memory 16.

The determination of branching by section 32 writes logic "1" in B bit in register 38 through AND gate 33 and OR gate 36.

The determination of no-branching by section 32 writes logic "1" in T bit in register 38 through AND gate 34 and OR gate 37. The content of register 38 is written in main memory 16, thereby changing the B and T bits of the conditional branch instruction.

In this embodiment, a flag field is added to a conditional branch instruction of a conventional type having an operation code field 21 and an operand field to store information representing the execution history of the instruction. The execution status of the instruction is classified as one of the following four cases:

(i) B=0, T=0

The initial state. No corresponding instruction has been executed.

(ii) B=0, T=1

Although the instruction has been executed, no branch has been made.

(iii) B=1, T=0

Each time the instruction was executed, branching was performed.

(iv) B=1, T=1

The instruction has been executed both with and without branching.

In this manner, each flag field 23 in the conditional branch instructions in a program of load module 15 loaded in main memory 16, and executed, stores path coverage measurement data.

Part or all of the program in main memory 16 may be unloaded therefrom under the control of the operating system. In this embodiment, part or all of the program is rewritten in load module 15 to produce load module 18 after program execution. Thus, when the program is executed again, load module 18 is loaded in main memory 16 in place of load module 15.

In this embodiment, after load module 15 is executed a given number of times, load module 18 is analyzed by path coverage report tool 19 to quantitatively analyze the path coverage state. The analysis process will be described with reference to FIGS. 2A and 2B.

Figure 2A:
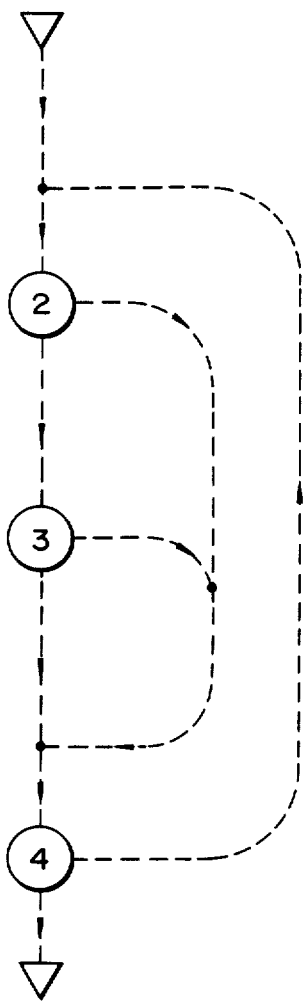
FIG. 2A is a diagram showing an example of a program flow, from a conditional branch instruction point of view.

Assume that, from a conditional branch instruction point of view, the program to be subjected to the path coverage measurement is constructed as shown in FIG. 2A. Referring to FIG. 2A, circles indicate conditional branch instructions.

Figure 2B:
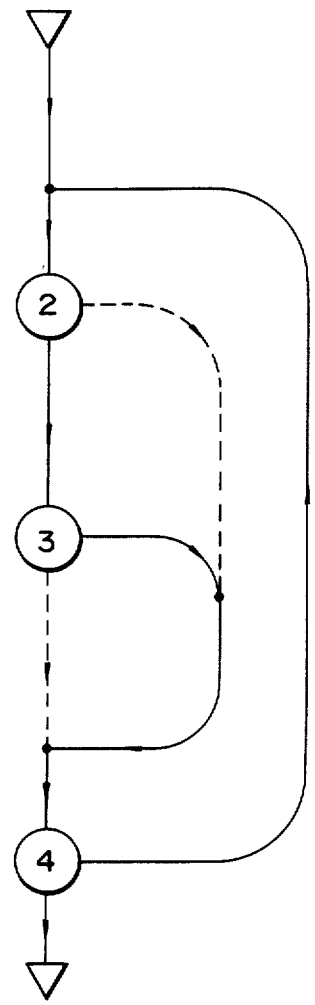
FIG. 2B is an analysis of a path coverage in the flow shown in FIG. 2A.

Tool 19 analyzes the structure in FIG. 2A and determines the passage of each path. The results are shown in FIG. 2B. Referring to FIG. 2B, paths through which the control has passed are indicated by solid lines, and paths through which the control has not passed are indicated by dotted lines. For example, at branch instruction 2 , the downward path is indicated by a solid line and the branch path is indicated by a dotted line. However, at branch instruction 3 , the downward path is indicated by a dotted line and the branch path is indicated by a solid line. At branch instruction 4 , both the downward and branch paths are indicated by solid lines.

Tool 19 analyzes the execution status of all the paths and outputs the results as path coverage report 20, as shown in FIG. 3.

Figure 5:
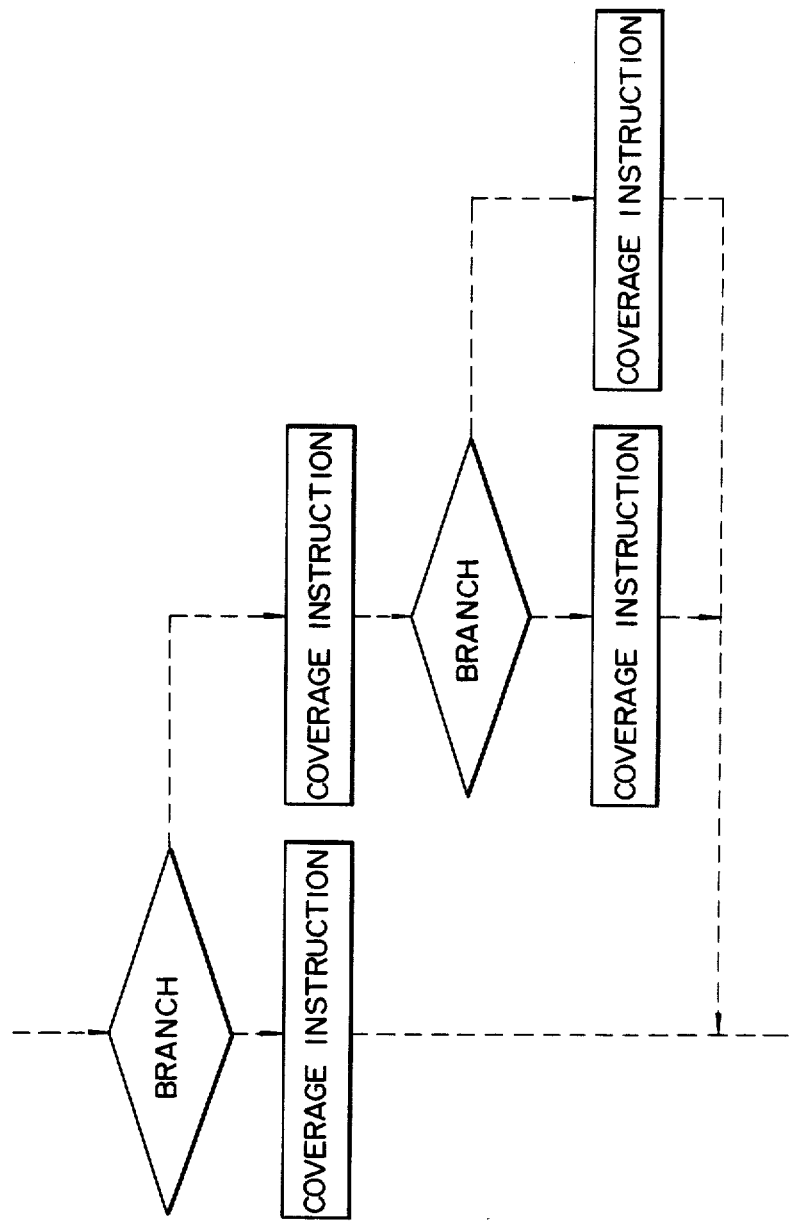
FIG. 5 is a conceptual view showing program paths and coverage instructions set in the paths, according to another embodiment of the present invention.

Another embodiment of the present invention will be described with reference to FIGS. 5 and 6. In this embodiment, compiler 12 inserts a COVERAGE instruction in all branch paths in the program flow, as shown in FIG. 5. A COVERAGE instruction changes itself into a THROUGH instruction. A THROUGH instruction is equivalent to a NOP (NO OPERATION) instruction, which means no operation will be performed. Object program 13, in all of whose paths (execution paths) COVERAGE instructions are inserted, is processed by linker 14. Thus, load module 15 is generated.

When the program is executed, load module 15 is loaded in main memory 16 as an executable program by an OS (operating system). Decoding and execution section 17, comprising CPU, sequentially reads, decodes and executes the instructions of the program. When the instruction fetched from main memory 16 is a COVERAGE instruction, section 17 modifies it to a THROUGH instruction.

FIG. 5 shows an embodiment of an instruction modifying means provided in section 17. An instruction read out from main memory 16 is set in instruction register

50. Instruction decoder 51 receives an OP code from register 50 and decodes the instruction. Register 52 stores the OP code in a THROUGH instruction. When decoder 51 decodes a COVERAGE instruction, it supplies decoded signal 55 to gate circuit 53. Upon reception of signal 55, gate circuit 53 supplies the OP code in the THROUGH instruction to register 54. Then, the COVERAGE instruction is modified to the THROUGH instruction. The instruction in register 54 is written at the same address as the COVERAGE instruction resident in main memory 16.

When the instruction fetched from main memory 16 is a THROUGH instruction, section 17 does not perform any operation and fetches the next instruction. This means that a THROUGH instruction indicates passage of a corresponding path at least once during program execution. In other words, the program loaded in main memory 16 (corresponding to load module 15) stores path coverage measurement data.

In this embodiment, after load module 15 is executed several times, path coverage report tool 19 refers to load module 18 and analyzes the path coverage status. Tool 19 counts the number C of COVERAGE instructions and the number T of THROUGH instructions in load module 18. Tool 19 calculates path coverage by $T/(C+T)$, and produces the calculated result as path coverage report 20.

The present invention is not limited to the particular embodiments described above. In the first embodiment, for example, the flag field of a conditional branch instruction consists of two bits, i.e., B and T bits. However, flag field 23 can be replaced with a first counter, counting the number of branches made, and a second counter, counting the number of pass-throughs.

What is claimed is:

1. A path coverage measuring system, comprising:
   a main memory;
   a central processing unit connected to said main memory;
   means connected to said main memory and said central processing unit for generating a load module, which includes conditional branch instructions each having a flag field which is set to a first state when control has been branched and which is set to a second state when control has been passed without branching;
   means connected to said main memory for loading the load module in said main memory as an executable program;
   decoding/executing means provided in said central processing unit and connected to said main memory, for decoding an instruction from said main memory, and for changing, when the instruction is a conditional branch instruction, the state of the flag field in the conditional branch instruction, in accordance with a branch condition of the conditional branch instruction; and
   means connected to said main memory and said means for loading the load module, for rewriting part or all of the program into the load module, and obtaining a path coverage measurement from the load module after execution, when part or all of the program is unloaded from said main memory.

2. A system according to claim 1, wherein said flag field consists of a branch bit, representing that a branch is made when the conditional branch instruction is performed, and a through bit, representing that the control has passed through the conditional branch instruction without branching.

3. A system according to claim 1, wherein said load module generating means comprises a compiler for converting a source program including a conditional branch instruction not having a flag field into an object program including a conditional branch instruction having a flag field.

4. A system according to claim 2, wherein said decoding/executing means changes the branch bit to logic "1" when the conditional branch instruction is satisfied, and changes the through bit to logic "1" when the conditional branch instruction is not satisfied, and writes the instruction whose branch and/or through bits are changed in the same address of said main memory from which the conditional branch instruction is read out.

5. A path coverage measuring system, comprising:
   a main memory;
   a central processing unit connected to said main memory;
   means connected to said main memory and said central processing unit for generating a load module having a program in which second instructions instructing conversion of themselves into first instructions instructing no operation are inserted in all paths of the program due to branching;
   means connected to said main memory and said means for generating a load module, for loading the load module into said main memory as a program comprising a plurality of instructions executable by said central processing unit;
   decoding/executing means, provided in said central processing unit and connected to said main memory, for sequentially reading the plurality of instructions from said main memory, converting when detecting the second instruction, the second instruction into the first instruction, and performing, when detecting the first instruction, no operation and fetching the next instruction of the plurality of instructions; and
   means for rewriting part or all of the program in the load module; and
   means for obtaining a path coverage measurement from the load module after execution, when part or all of the program is unloaded from said main memory.

6. A system according to claim 5, wherein said means for obtaining a path coverage measurement from the load module counts a number T of the first instructions and a number C of the second instructions and calculates path coverage, given by $T/(C+T)$.

* * * * *